(12) United States Patent  
Aljabari

(10) Patent No.: US 8,949,066 B2
(45) Date of Patent: *Feb. 3, 2015

(54) SYSTEM FOR DETERMINING AMBIENT TEMPERATURE

(75) Inventor: Mohammad A. Aljabari, Brooklyn Park, MN (US)

(73) Assignee: Honeywell International Inc., Morristown, NJ (US)

(*) Notice: Subject to any disclaimer, the term of this patent is extended or adjusted under 35 U.S.C. 154(b) by 37 days.

This patent is subject to a terminal disclaimer.

(21) Appl. No.: 13/434,810

(22) Filed: Mar. 29, 2012

(65) Prior Publication Data

US 2012/0181011 A1 Jul. 19, 2012

Related U.S. Application Data

(63) Continuation of application No. 11/950,394, filed on Dec. 4, 2007, now Pat. No. 8,280,673.

(51) Int. Cl.
*G01K 1/00* (2006.01)
*G01K 3/00* (2006.01)
(Continued)

(52) U.S. Cl.
CPC ... *G01K 7/42* (2013.01); *G01K 1/20* (2013.01)
USPC .......................................... 702/130; 374/110

(58) Field of Classification Search
USPC ............. 702/130, 57, 60, 64–65, 81, 84, 127, 702/131, 133, 182–183, 189; 374/10–11, 374/15, 100–104, 109–112, 115, 132–134, 374/137, 163, 166, 186, E3.001, E13.001; 236/91 D, 91 E, 91 F, 91 R; 700/12, 700/275–278, 299–300
See application file for complete search history.

(56) References Cited

U.S. PATENT DOCUMENTS 3,948,441 A 4/1976 Perkins et al.
3,988,708 A 10/1976 Thorsteinsson et al.
(Continued)

FOREIGN PATENT DOCUMENTS

DE 19728803 C1 8/1999
EP 0803788 7/2001

OTHER PUBLICATIONS

Bibbero, R.J., Estimating Temperature Rise in Electronic Equipment Cases, May 1951, Proceedings of the IRE, vol. 39, Issue 5, pp. 504-508.*

(Continued)

*Primary Examiner* — Toan Le
(74) *Attorney, Agent, or Firm* — Seager Tufte & Wickhem LLC.

(57) ABSTRACT

A mechanism for indicating ambient temperature of an enclosure from temperatures determined within the enclosure. The temperatures may be obtained from two or more sensors at each of two or more locations within the enclosure. The enclosure may include an apparatus inside such as electronics of which power consumption may be determined. Data including temperatures of two locations within the enclosure at various electronics power consumption levels may be entered into a 2-D plot. An approximation of the 2-D plot may be effected with an appropriate equation to be solved for ambient temperature. The data of the 2-D plot plus temperatures of a third location and air flow levels in the enclosure may be entered into a 3-D plot. An approximation of the 3-D plot may be effected with an appropriate equation to be solved for ambient temperature.

26 Claims, 11 Drawing Sheets

(51) Int. Cl.
*G01K 7/42* (2006.01)
*G01K 1/20* (2006.01)

(56) References Cited

U.S. PATENT DOCUMENTS

| | | |
|---|---|---|
| 4,001,752 A | 1/1977 | Hazleton |
| 4,008,454 A | 2/1977 | Bowling |
| 4,075,594 A | 2/1978 | Tomoyoshi |
| 4,095,740 A | 6/1978 | Wirth |
| 4,154,397 A | 5/1979 | Carlson |
| 4,172,555 A | 10/1979 | Levine |
| 4,181,957 A | 1/1980 | Pinckaers |
| 4,240,077 A | 12/1980 | Hughes et al. |
| 4,241,872 A | 12/1980 | Frankenberg |
| 4,248,375 A | 2/1981 | Whitney |
| 4,283,701 A | 8/1981 | Ryckman, Jr. |
| 4,319,711 A | 3/1982 | Barker et al. |
| 4,332,352 A | 6/1982 | Jaeger |
| 4,341,345 A | 7/1982 | Hammer et al. |
| 4,358,667 A | 11/1982 | Johnson et al. |
| 4,373,664 A | 2/1983 | Barker et al. |
| 4,387,763 A | 6/1983 | Benton |
| 4,399,428 A | 8/1983 | Hughes et al. |
| 4,448,033 A | 5/1984 | Briccetti |
| 4,460,125 A | 7/1984 | Barker et al. |
| 4,480,174 A | 10/1984 | Hummel |
| 4,577,977 A | 3/1986 | Pejsa |
| 4,606,401 A | 8/1986 | Levine et al. |
| 4,632,177 A | 12/1986 | Beckey |
| 4,641,012 A | 2/1987 | Roberts |
| 4,695,942 A | 9/1987 | Levine et al. |
| 4,703,298 A | 10/1987 | Gerson |
| 4,730,941 A | 3/1988 | Levine et al. |
| 4,741,476 A * | 5/1988 | Russo et al. ............... 236/46 R |
| 4,746,785 A | 5/1988 | De Longhi |
| 4,776,514 A | 10/1988 | Johnstone et al. |
| 4,793,553 A | 12/1988 | Berman |
| 4,829,458 A | 5/1989 | Russo et al. |
| RE32,960 E | 6/1989 | Levine |
| 4,837,731 A | 6/1989 | Levine et al. |
| 4,841,458 A | 6/1989 | Levine et al. |
| 4,864,513 A | 9/1989 | Levine et al. |
| 4,910,966 A | 3/1990 | Levine et al. |
| 4,916,912 A | 4/1990 | Levine et al. |
| 4,951,473 A | 8/1990 | Levine et al. |
| 4,974,417 A | 12/1990 | Levine et al. |
| 4,974,418 A | 12/1990 | Levine et al. |
| 5,001,656 A | 3/1991 | Zimmerman et al. |
| 5,025,242 A | 6/1991 | Holtkamp et al. |
| 5,025,984 A | 6/1991 | Bird et al. |
| 5,039,010 A | 8/1991 | Juntunen |
| 5,088,806 A | 2/1992 | McCartney et al. |
| 5,105,366 A | 4/1992 | Beckey |
| 5,170,752 A | 12/1992 | Binversie et al. |
| 5,197,668 A | 3/1993 | Ratz et al. |
| 5,199,637 A | 4/1993 | Adams |
| 5,203,497 A | 4/1993 | Ratz et al. |
| 5,219,119 A | 6/1993 | Kasper et al. |
| 5,269,458 A | 12/1993 | Sol |
| 5,270,952 A | 12/1993 | Adams et al. |
| 5,410,230 A | 4/1995 | Bessler et al. |
| 5,416,728 A | 5/1995 | Rudzewicz et al. |
| 5,453,944 A | 9/1995 | Baumoel |
| 5,461,372 A | 10/1995 | Busak et al. |
| 5,524,444 A | 6/1996 | Gromala et al. |
| 5,533,349 A | 7/1996 | Gromala et al. |
| 5,542,279 A | 8/1996 | Erdman et al. |
| 5,542,285 A | 8/1996 | Merilainen et al. |
| 5,552,956 A | 9/1996 | Pasquarette et al. |
| 5,555,927 A | 9/1996 | Shah |
| 5,574,421 A | 11/1996 | Hickling |
| 5,615,829 A | 4/1997 | Porter |
| 5,659,285 A | 8/1997 | Takeda |
| 5,735,604 A | 4/1998 | Ewals et al. |
| 5,758,407 A | 6/1998 | Hickling |
| 5,795,112 A | 8/1998 | Senda |
| 5,803,357 A * | 9/1998 | Lakin ........................ 236/78 B |
| 5,812,061 A | 9/1998 | Simons |
| 5,839,654 A | 11/1998 | Weber |
| 5,950,709 A | 9/1999 | Krueger et al. |
| 6,044,808 A | 4/2000 | Hollis |
| 6,088,661 A | 7/2000 | Poublon |
| 6,169,937 B1 | 1/2001 | Peterson |
| 6,189,798 B1 | 2/2001 | Sano et al. |
| 6,208,905 B1 | 3/2001 | Giddings et al. |
| 6,460,774 B2 | 10/2002 | Sumida et al. |
| 6,487,457 B1 | 11/2002 | Hull et al. |
| 6,502,238 B1 | 12/2002 | Pavan et al. |
| 6,505,781 B2 | 1/2003 | Altman |
| 6,536,678 B2 | 3/2003 | Pouchak |
| 6,595,430 B1 | 7/2003 | Shah |
| 6,598,056 B1 | 7/2003 | Hull et al. |
| 6,621,507 B1 | 9/2003 | Shah |
| 6,644,849 B1 | 11/2003 | Conner |
| 6,647,302 B2 | 11/2003 | Pouchak |
| 6,694,927 B1 | 2/2004 | Pouchak et al. |
| 6,695,471 B2 | 2/2004 | Hashimoto et al. |
| 6,728,600 B1 | 4/2004 | Contaldo et al. |
| 6,804,169 B2 | 10/2004 | Addy et al. |
| 6,850,856 B1 | 2/2005 | Gauthier et al. |
| 6,851,621 B1 | 2/2005 | Wacker et al. |
| 6,938,432 B2 | 9/2005 | Enomoto |
| 6,974,251 B2 | 12/2005 | DeRonne et al. |
| 7,044,637 B2 | 5/2006 | O'Neill et al. |
| 7,364,353 B2 | 4/2008 | Kolk |
| 7,387,437 B2 | 6/2008 | Brown et al. |
| 7,395,173 B2 | 7/2008 | Kautz et al. |
| 7,406,397 B2 | 7/2008 | Hyde et al. |
| 7,656,302 B2 | 2/2010 | Lang |
| 7,784,705 B2 | 8/2010 | Kasper et al. |
| 8,280,673 B2 * | 10/2012 | Aljabari ........................ 702/130 |
| 2005/0209813 A1 | 9/2005 | Kautz et al. |
| 2007/0295713 A1 | 12/2007 | Carlton-Foss |
| 2009/0144014 A1 | 6/2009 | Aljabari |

OTHER PUBLICATIONS

Choi et al., Modeling and Managing Thermal Profiles of rack-mounted Servers with ThermoStat, Feb. 10-14, 2007, IEEE 13th International Symposium on High Performance Computer Architecture, 2007, HPCA 2007, pp. 205-215.*
List of Abstracts of IEEE 13th International Symposium on High Performance Computer Architecture, 2007, HPCA 2007.*
Donald McNamara, Thermal Sensing Requires System-Level Design, May 2007, Power Electronics Technology, pp. 28-35.*
"T4700A&B Digital Chronotherm Line Voltage Thermostat," Honeywell Engineering Specification No. ES26160, 23 pages, Released Jun. 1999.
U.S. Appl. No. 13/434,813, filed Mar. 29, 2012.
U.S. Appl. No. 13/447,138, filed Apr. 13, 2012.
John et al., Advancement of Multifunctional Support Structure Technologies (AMFSST) Therminic, pp. 98-103, Sep. 2007.
Prior Art Heat Compensation Techniques for Thermostats That Existed Prior to Feb. 27, 2006, 1 page, created on Oct. 2, 2006.
International Search Report for Corresponding Application No. EP 08856563 dated Jun. 4, 2014.

* cited by examiner

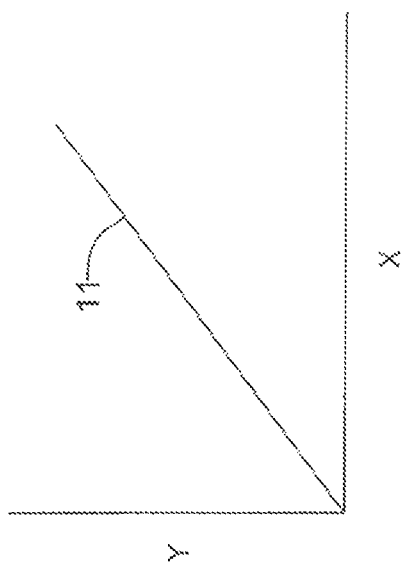

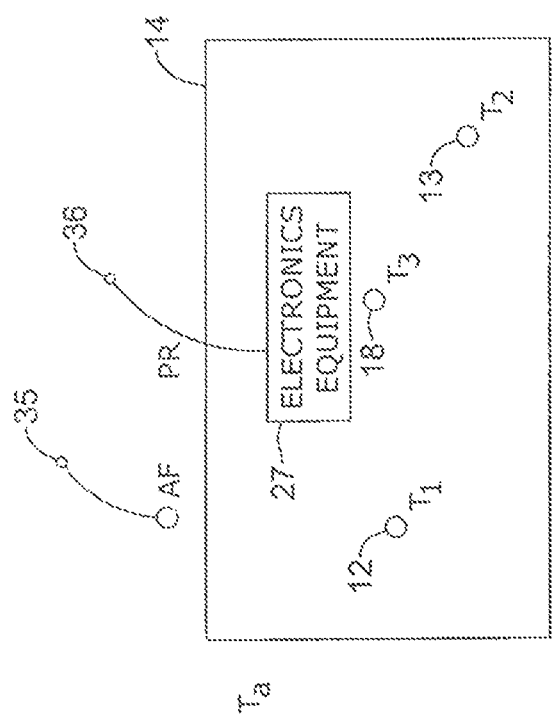

| | axis 1<br>$T_1$ | axis 2<br>$T_2$ | axis 3<br>$T_3$ | | Adjusted Data<br>for $T_a = 70°$ | axis 1<br>$T_1 - T_a$ | axis 2<br>$T_2 - T_a$ | axis 3<br>$T_3 - T_a$ | Data<br>Point |
|---|---|---|---|---|---|---|---|---|---|
| Air Flow 1 | 85 | 78 | 74 | Power 1 | $\Rightarrow$ | 15 | 8 | 4 | A |
| (21) | 88 | 79 | 76 | Power 2 | | 18 | 9 | 6 | B |
| | 89 | 84 | 79 | Power 3 | | 19 | 14 | 9 | C |
| Air Flow 2 | 80 | 76 | 71 | Power 1 | $\Rightarrow$ | 10 | 6 | 1 | D |
| (22) | 84 | 78 | 75 | Power 2 | | 14 | 8 | 5 | E |
| | 86 | 81 | 77 | Power 3 | | 16 | 11 | 7 | F |
| Air Flow 3 | 91 | 80 | 76 | Power 1 | $\Rightarrow$ | 21 | 10 | 6 | G |
| (23) | 93 | 84 | 78 | Power 2 | | 23 | 14 | 8 | H |
| | 95 | 88 | 82 | Power 3 | | 25 | 18 | 12 | I |

*Figure 5*

SYSTEM FOR DETERMINING AMBIENT TEMPERATURE

This is a continuation of U.S. patent application Ser. No. 11/950,394, entitled "A System for Determining Ambient Temperature", filed Dec. 4, 2007, which is incorporated hereby by reference.

BACKGROUND

The present invention pertains to temperature sensing and particularly to indirect temperature determination.

SUMMARY

The invention is a mechanism for indicating an ambient temperature about an enclosure containing a device, from determined temperatures within the enclosure.

BRIEF DESCRIPTION OF THE DRAWING

FIG. 2 is a diagram of a straight line fitted to data from sensors in the enclosure plotted on a two-coordinate graph for determining ambient temperature from a fitted equation;

FIG. 4 is a diagram of an enclosure of equipment having sensors for providing temperatures from three locations in the enclosure;

FIG. 5 a table of data from sensors for three locations in the enclosure for various air flows and power consumption levels in the equipment in the enclosure;

DESCRIPTION

Figure 1:
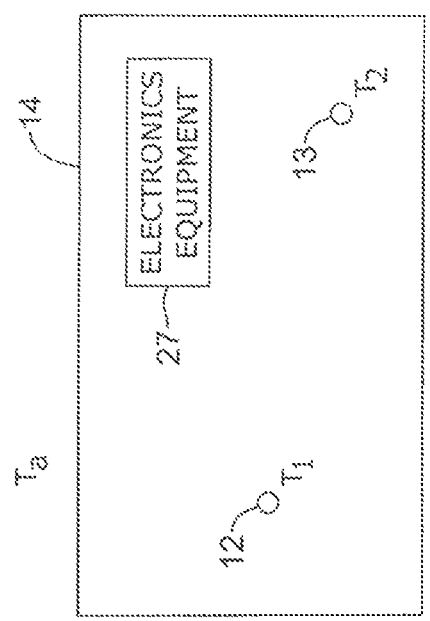
FIG. 1 is a diagram of enclosure having possibly power consuming equipment and temperature sensors for providing temperatures from two locations in the enclosure.

Accurate ambient temperature sensing is needed in a thermostat application. Sensing temperature using thermistors, semiconductor temperature sensors, thermocouples or any other form of temperature sensors from within an enclosure of electronics or equipment may result in a temperature higher than the ambient air temperature surrounding the enclosure of the equipment or device. The term "ambient" used herein refers to the volume proximate to, external of and surrounding the enclosure. The difference between the ambient and the sensed temperature may vary and be affected by the amount of electrical energy needed to power the device, ventilation, how close or far the temperature sensors are from warm components of the device, air flow surrounding the enclosure and/or device, device materials and their thermal conductivities, and so forth. If the amount of heat generated inside the enclosure is low and constant, constant temperature compensation might be sufficient. But when the heat generated inside the case or enclosure is high and variable, computing the ambient temperature may become very challenging.

The invention may be used for enabling the device or a processor to calculate the ambient temperature by sensing two or more different temperature points within the enclosure. An algorithm used to calculate the ambient temperature may be independent of power consumption of the device.

Two or more temperature sensors may be placed in different locations within the enclosure of the device. In theory, any two locations that have different temperatures in steady state under a given load should work. In practice, one temperature sensor "$T_{hot}$" may be placed close to the heat generating components. The other temperature sensor "$T_{cool}$" may be placed in about the coldest location within the device. Under very stable ambient conditions, the temperatures may be sampled at different equipment or device power load conditions. The temperatures sampled may be used to generate equations in terms of power (by means of curve fitting). The equations may be regarded as approximations of two-dimensional and three-dimensional relationships which may be graphs, plots, representations, and/or the like.

The equations may include the following. $T_{cool} = T_{ambient} + f(x) > T_{cool}$ = determined cool temperature. x=power dissipated in the device. f(x)=heat rise with respect to power for the cool temperature sensor. $T_{hot} = T_{ambient} + f(x) > T_{hot}$ = determined hot temperature. x=power dissipated in the device. f(x)=heat rise with respect to power for the hot temperature sensor. From the system of two equations, x and $T_{ambient}$ are unknowns. Once these equations are solved, $T_{ambient} = f(T_{cool}, T_{hot})$. And since $T_{cool}$ and $T_{hot}$ are determined values, ambient temperature may be calculated from them. f(x) may be approximated (i.e., fitted) to a linear function, but it can also be non-linear for increased accuracy; however, in the latter case f(x) would be more complicated to implement.

The present approach does not suggest sensing ambient temperature via one sensor, such as a thermistor, then sensing a warm temperature via another sensor and calculating an error to compensate for the sensed ambient temperature. The ambient temperature may be calculated from two different temperatures within an enclosure of a device or equipment, and therefore ambient temperature becomes a function of both temperatures or a function of additional temperatures if more than two sensors are used, where the additional temperatures and the initial two temperatures are averaged together into two or three temperatures within the enclosure.

The present approach does not require special algorithms for special cases; it may work well even if there is no heat generated within the device. The sought temperature is not necessarily time dependent; the ambient temperature may be a function of the different temperatures and be calculated virtually instantaneously.

The present system may use a two-dimensional (2-D) model with two or more temperature sensors in two groups of the sensors in an enclosure of some equipment, or a three-dimensional (3-D) model with three or more temperature sensors in three groups of sensors in the enclosure to determine the ambient temperature. Each group may provide an average temperature of the sensors in the group. The 3-D model may also be used to readily detect air flow. The equipment may be a piece of electronics that generates heat because the usage of power within the enclosure where the sensors are placed. Although the equipment may be inactivated and the sensors detecting temperatures inside the enclosure of the equipment may themselves indicate the ambient temperature.

Equations for determining ambient temperature from internal enclosure sensors may have a form of the following equation, $$T_a=(T_1-aT_2-b)/(1-a),$$

where $T_a$ is ambient temperature, $T_1$ may represent a hotter temperature and $T_2$ may represent a colder temperature in the enclosure 14 containing equipment 27. Sensors 12 and 13 for $T_1$ and $T_2$, respectively, may be situated in two different places of the enclosure 14, as shown in FIG. 1. Data may be taken and plotted on a two dimensional graph as shown in FIG. 2. A classic form of the equation for a straight line fitted to a plot of temperature data may be $$y=ax+b.$$

Figure 3A:
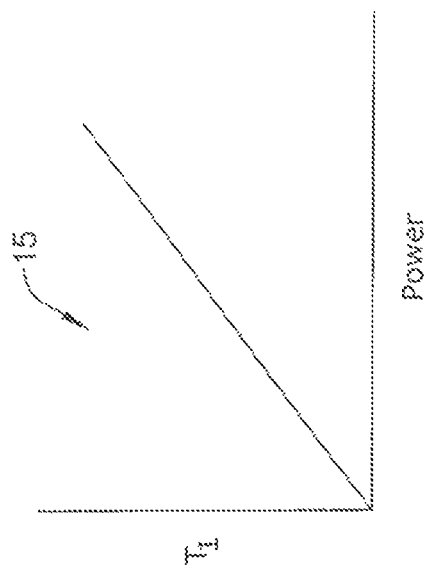
FIG. 3a a graph of a temperature of a first vicinity in the enclosure versus power.
Figure 3B:
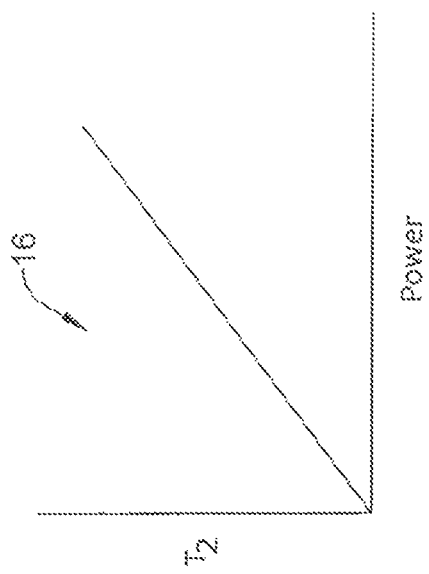
FIG. 3b a graph of a temperature of a second vicinity in the enclosure versus power.
Figure 3C:
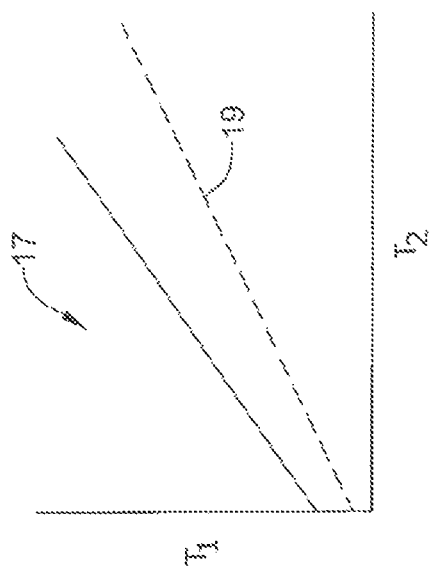
FIG. 3c is a graph resulting from a combining the graphs of FIGS. 3a and 3b into one of the first temperature of the first vicinity versus the temperature of the second vicinity of the enclosure.

From the graph, the constant "a" may be the slope and the constant "b" may be the offset of the line 11 from the zero coordinates. The "constant" nomenclature "a", "b", and so on, may be lower or upper case. The graph may show $T_1$ versus $T_2$ for various ambient temperatures. There may instead be two or more sensors situated in a vicinity representing $T_1$, and two or more sensors situated in another vicinity representing $T_2$, rather than single sensors representing $T_1$ and $T_2$, respectively. An output average of the two or more sensors may be taken for $T_1$ and an average of the other two or more sensors may be taken for $T_2$. An additional third sensor or group of sensors may be used for averaging with one or more sensors or for $T_3$ and for determining air flow direction and/or magnitude. For illustrative purposes, just two sensors 12 and 13 may be used in the enclosure 14. When the equipment or device 27 in the enclosure 14 is energized, one may have $T_1>T_2>T_a$. $T_1$ may be regarded as the $T_{hot}$ and $T_2$ may be regarded as $T_{cold}$. Using the equation, $$T_a=(T_1-aT_2-b)/(1-a),$$

with values provided for the constants, the ambient temperature $T_a$ may be determined. Values of the constants may be determined with data from empirical tests, simulation or calculations under conditions that the enclosure 14 is likely to be subject. Data may be taken from the temperature sensors and plotted in graphs 15 and 16 in FIGS. 3a and 3b for $T_1$ versus power and $T_2$ versus power, respectively. Data may be taken at different power levels of the equipment 27 in the enclosure 14. The ambient temperature may be held constant. The plots may be fitted with straight lines. The graphs 15 and 16 may be combined into a graph 17 in FIG. 3c. The common power determinations or measurements of the graphs 15 and 16 may drop out, resulting in $T_1$ versus $T_2$ in a graph 17. The slope value of the solid line in graph 17 may be determined and substituted for "a" and the offset from graph 17 may be determined, measured or calculated and substituted for "b". One set of data as shown in FIGS. 3a-3c may be sufficient in a situation where the direction and magnitude of air flow, if any, remain the same for measurements or determinations, or are negligible, and thus the resultant equation should be adequate in determining the ambient temperature $T_a$. Where air flow is changed, then a new set of data, like that in FIGS. 3a and 3b, should be taken for the equipment 27 of enclosure 14 situated in the new air flow. The new air flow may result in a different line (dashed) 19 in graph 17 of FIG. 3c.

Figure 4A:
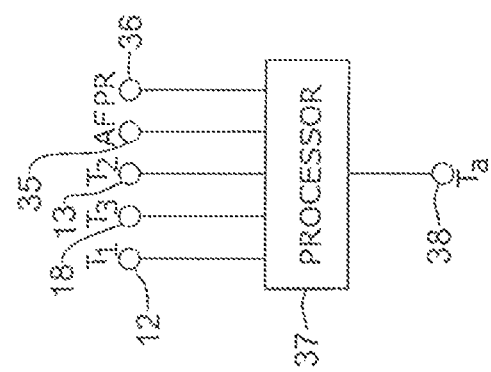
FIG. 4a is a diagram of a processor with inputs from various sensors pertinent to the enclosure.

The two-dimensional approach just noted herein may be extended to a three-dimensional approach with a third sensor 18 situated in the enclosure 14, as illustratively shown in FIG. 4. FIG. 4a shows a processor 37 which may determine an ambient temperature proximate to the enclosure 14 based on outputs from temperature sensors 12, 18 and 13, an air flow sensor 35 proximate (external and/or internal) to the enclosure, and a power level sensor 36 connected to a power input to the electronics equipment 27 and/or processor 37. The ambient temperature may be indicated at an output 38 of the processor 37 or electronics 27. Electronics 27 or processor 37 may be configured for either the two-dimensional approach and/or the three-dimensional approach as noted herein. Processor 37 may be internal or external to enclosure 14.

The 3-D approach may result in an equation which accommodates various air flows. The resultant plot of the data may result in a 3-D surface. The simplest form of this surface is a plane of a 3-axis coordinate system. The basic equation form may be $$ax+by+cz+d=0.$$

For improved accuracy, a more complicated non-linear 3-D surface equation may be generated from the data. Three temperature readings for $T_1$ sensor 12, $T_2$ sensor 13 and $T_3$ sensor 18 may be taken for each power level at various air flows or vice versa. The ambient temperature should be constant during the data taking.

For an illustrative example of data taking and determining the values of the constants for the three equations of the three-dimensional approach, one may note tables of FIG. 5. Each sensor and respective temperature may represent a coordinate axis of a 3-axis or 3-D graph 24 in FIG. 6. In table 21, temperature determinations or measurements $T_1$, $T_2$ and $T_3$ from sensors 12, 13 and 18 for a first air flow and a first power level may be 85, 78 and 74 degrees F., respectively; for the first air flow and second power level, the determinations or measurements may be 88, 79 and 76 degrees, respectively; and for the first air flow and third power level, the determinations or measurements may be 89, 84 and 79, respectively. In table 22, temperature determinations or measurements $T_1$, $T_2$, and $T_3$ from sensors 12, 13 and 18 for a second air flow and the first power level may be 80, 76, and 71 degrees, respectively; for the second air flow and the second power level, the determinations or measurements may be 84, 78 and 75 degrees, respectively; and for the second air flow and the third power level the determinations or measurements may be 86, 81 and 77 degrees, respectively. In table 23, temperature determinations or measurements $T_1$, $T_2$, and $T_3$ from sensors 12, 13 and 18 for a third air flow and the first power level, the determinations or measurements may be 91, 80 and 76 degrees, respectively; and for the third air flow and the second power level the determinations or measurements may be 93, 84, and 78 degrees, respectively; and for the third air flow and the second power level, the determinations or measurements may be 95, 88 and 82 degrees, respectively.

Figure 6:
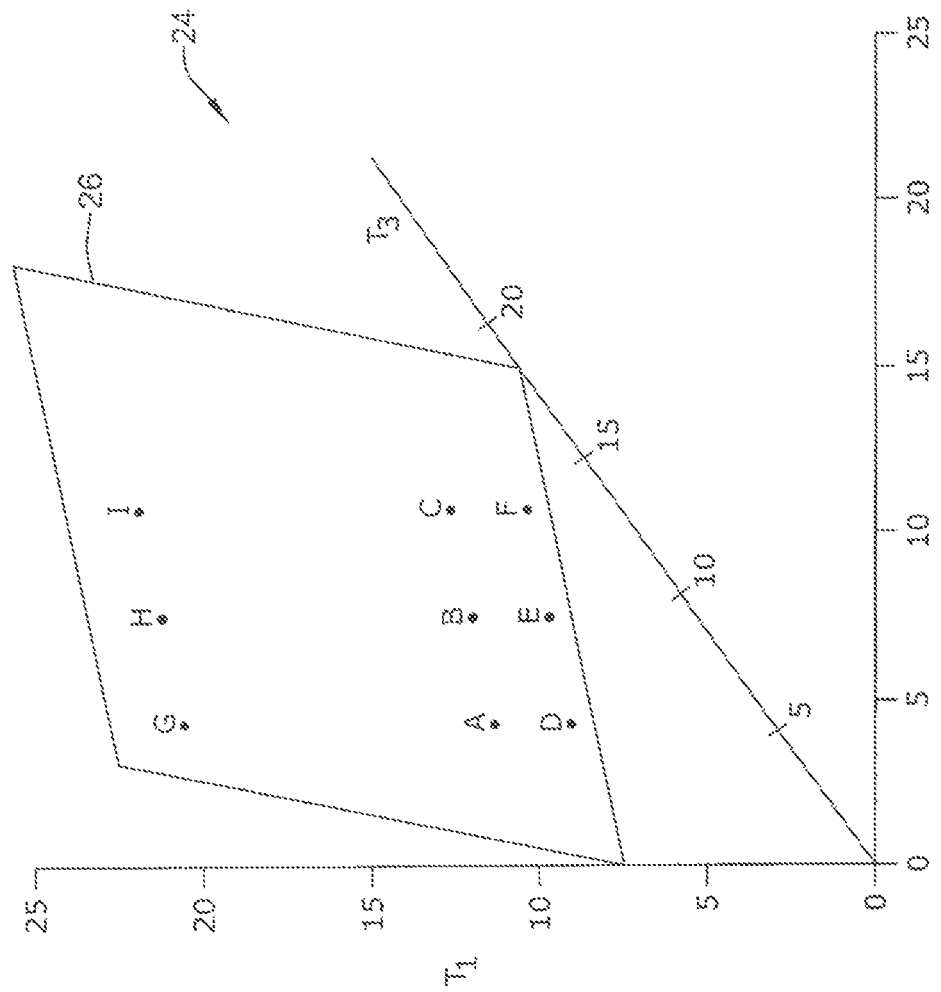
FIG. 6 is a three-coordinate graph having a plot of the data of FIG. 5 which is plane-fitted with an equation.

Since the ambient temperature ($T_a$) may be regarded as at 70 degrees F., during data determination or a taking of the empirical measurements, the data may be adjusted for $T_a$, resulting in data points for plotting on the 3-coordinate graph 24, as illustrated in FIG. 6. The data points may be 15, 8, 4; 18, 9, 6; and 19, 14, 9; for air flow 1 and power levels 1, 2 and 3, respectively. Data points may be 10, 6, 1; 14, 8, 5; and 16, 11, 7; for air flow 2 and power levels 1, 2 and 3, respectively. Data points may be 21, 10, 6; 23, 14, 8; and 25, 18, 12; for air flow 3 and power levels 1, 2 and 3, respectively. The data points from 15, 8, 4 through 25, 18, 12, as indicated herein, may be labeled A, B, C, D, E, F, G, H and I, respectively. The latter labels may be used in graph 24. One may plane fit the data points and come up with a plane 26 and a corresponding equation. These data points may be inserted in versions of the following equation, $$ax+by+cz+d=0,$$

to obtain values for the respective constants for the ultimate equation for obtaining $T_a$ from $T_1$, $T_2$ and $T_3$ at various air flows and power levels of the enclosure 14 and equipment 27.

Figure 7:
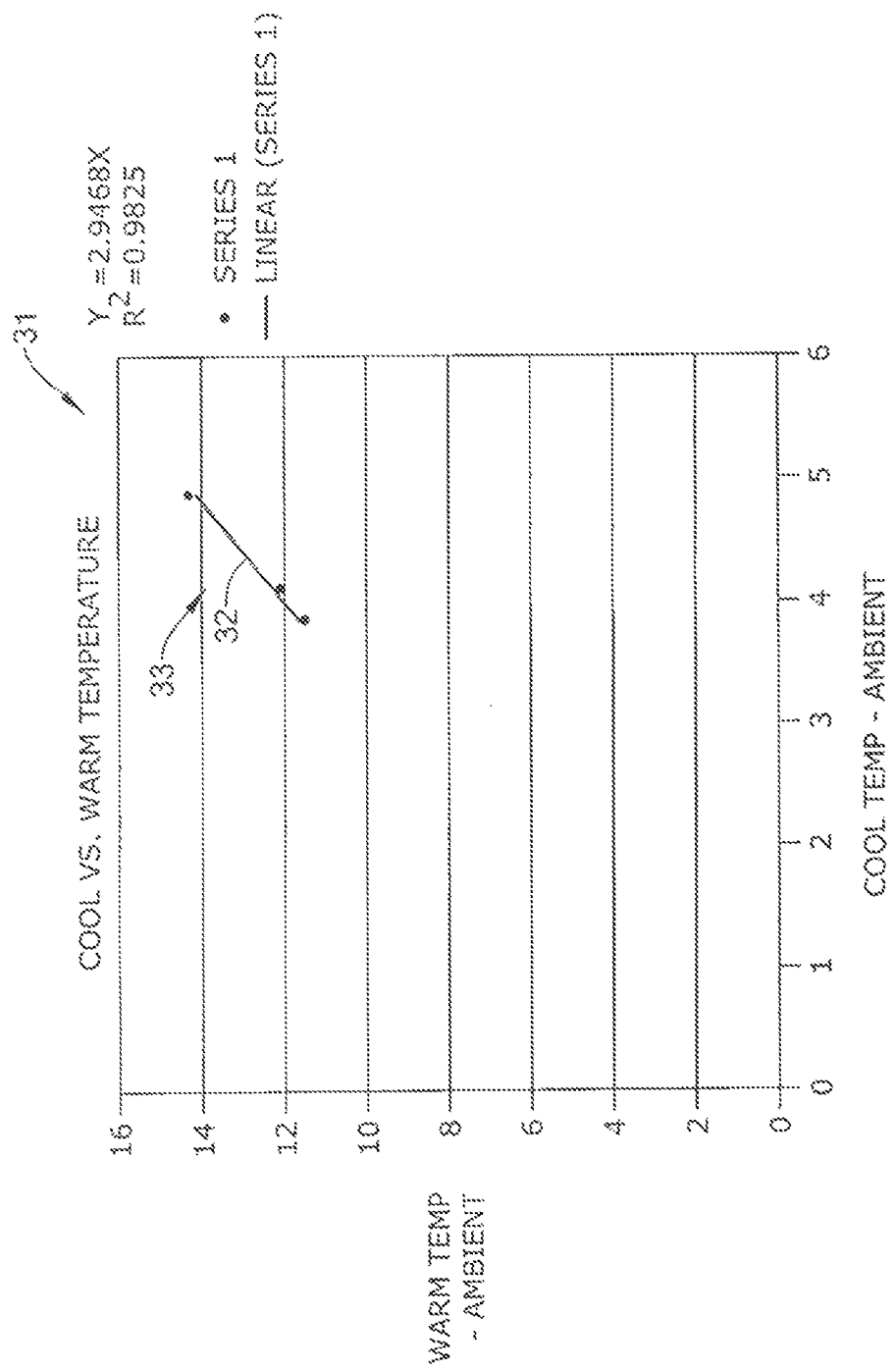
FIG. 7 is a two-coordinate graph of cool versus warm temperatures.

For an illustrative example, with respect to the 2-D model, the following temperatures were logged at 70 degrees F. ambient condition. These are at 3 different load conditions. The cool temperatures are 73.95439, 74.14308 and 74.80374 degrees F. The warm temperatures are 81.49281, 82.11406 and 84.3687. From these temperatures, one may subtract temperatures from ambient and graph. The results from the cool temperatures are 3.95439, 4.14308 and 4.80374. The results from the warm temperatures are 11.49281, 12.11406 and 14.3687. The results for both sets of temperatures may be plotted as coordinate points 33 a graph 31 of FIG. 7. One may generate a best curve fit 32. In this condition, it happens to be linear.

$$T_{warm} - T_{ambient} = A*(T_{cool} - T_{ambient}) + B,$$

where A=2.9468 and B=0. One may look to the plot 33 and linear curve 32 fitting in graph 31 of FIG. 7. One may have $T_{ambient} = (T_{warm} - A*T_{cool} - B)/(1-A)$. After applying this equation to the original temperature, the calculated ambient temperatures are 70.08218, 70.04868 and 69.89057, respectively. As may be seen, the temperatures appear accurate. And since the above items have been the extreme load conditions, different loads in between would generate temperatures that fall on the same curve and therefore the ambient temperature can be recovered. When the same device is exposed to different ambient temperatures, the temperature rise on the sensors is constant and the ambient temperature may be recovered. With an example at ambient temperature=80 degrees, one may get cool temperatures of 84.03199, 83.59956 and 84.8985, and hot temperatures of 92.10085, 91.00635 and 94.71613. The calculated temperatures may be 79.88731, 79.79496 and 79.85554, respectively.

Figure 8:
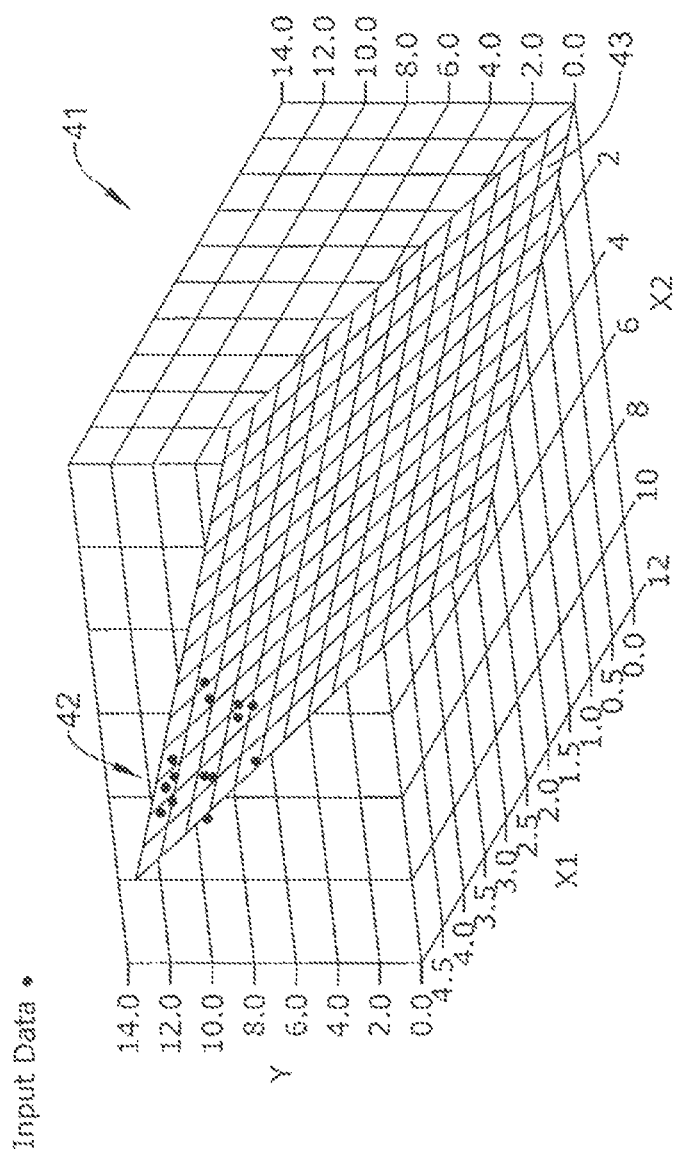
FIG. 8 is a three-coordinate graph having a plot of another set of data which is plane-fitted with an equation.

With respect to a 3-D model, three given different temperature sensors will generate a 3-D surface equation, in the case of a linear approach, this would be a plane. For example, $Ax+By+Cz+D=0$. Assuming that the plane crosses at (0,0,0), which means if no heat is generated within the device, then the temperature sensed by the sensors=ambient. $Ax+By+Cz=0$, x,y,z are $T_1-T_{ambient}$, $T_2-T_{ambient}$, and $T_3-T_{ambient}$, respectively.

$$T_{Ambient} = (A*T_1 B*T_2 C*T_3)/(A+B+C),$$

where A, B and C are plane constants, and may be calculated algebraically or by the use of curve/surface fit software. In some cases, temperatures inside an enclosure might be affected by external environmental changes and a 2-D solution might not be sufficient to recover ambient temperature accurately. For instance, airflow direction or speed may cause some variation and constantly generate temperatures that do not fall on a 2-D dimensional curve. With a third sensor, temperature variations may be modeled with a surface of 3-D equation. A graph 41 in FIG. 8 shows an example of that. In this example, the points 42 are surface fit to a plane 43, instead of a 2-D curve or a line 32 as in FIG. 7.

Determinations, measurements, plotting, graphs, curve-, line- and plane-fitting, calculations, approximations, relationships, representations, managing equations and getting solutions, obtaining values for constants and temperatures such as ambient, doing flow and power level determinations or measurements, and other items for effecting the present system, and so forth, may be effected electronically with a processor or the like, along with appropriate software as desired or needed.

In the present specification, some of the matter may be of a hypothetical or prophetic nature although stated in another manner or tense.

Although the invention has been described with respect to at least one illustrative example, many variations and modifications will become apparent to those skilled in the art upon reading the present specification. It is therefore the intention that the appended claims be interpreted as broadly as possible in view of the prior art to include all such variations and modifications.

What is claimed is:

1. A thermostat that functions to provide control signals to temperature control equipment to maintain a desired temperature in a space, the thermostat comprising:
   a housing;
   one or more heat generating elements within the housing, wherein during operation of the thermostat, the one or more heat generating elements cause a first region within the housing to be at a different temperature than a second region within the housing;
   a first temperature sensor within the housing for reporting a measure that is related to the temperature in the first region;
   a second temperature sensor within the housing for reporting a measure that is related to the temperature in the second region;
   a controller in communication with the first temperature sensor and the second temperature sensor, the controller determining a measure related to an ambient temperature outside of the housing based, at least in part, on:
      the measure that is related to the temperature in the first region reported by the first temperature sensor;
      the measure that is related to the temperature in the second region reported by the second temperature sensor;
      a first constant, wherein the first constant is multiplied by the measure that is related to the temperature in the first region reported by the first temperature sensor, but is not multiplied by a difference between the measure that is related to the temperature in the first region reported by the first temperature sensor and the measure that is related to the temperature in the second region reported by the second temperature sensor; and
   the thermostat using the measure related to the ambient temperature outside of the housing to determine one or more control signals for controlling temperature control equipment.

2. The thermostat of claim 1, wherein the thermostat is powered, at least in part, by electrical energy, and wherein the one or more heat generating components generate heat by consuming the electrical energy.

3. The thermostat of claim 2, wherein a level of the electrical energy needed to power the thermostat changes over time.

4. The thermostat of claim 3, wherein the measure related to the ambient temperature determined by the controller is relatively independent of the level of the electrical energy needed to power the thermostat.

5. The thermostat of claim 1, wherein the controller determines the measure related to the ambient temperature outside of the housing based, at least in part, on a predetermined relationship between the measure related to the ambient temperature outside of the housing, the measure related to the temperature in the first region reported by the first temperature sensor, the measure related to the temperature in the second region reported by the second temperature sensor, the first constant and a second constant.

6. The thermostat of claim 5, wherein the thermostat is powered by a level of electrical energy that changes over time, and wherein the measure related to the ambient temperature determined by the controller is relatively independent of the level of the electrical energy powering the thermostat.

7. The thermostat of claim 5, wherein the predetermined relationship includes a linear relationship.

8. The thermostat of claim 5, wherein the predetermined relationship includes a non-linear relationship.

9. The thermostat of claim 5, wherein the predetermined relationship includes a two-dimensional relationship.

10. The thermostat of claim 5, wherein the predetermined relationship includes a three dimensional relationship.

11. The thermostat of claim 1, wherein the thermostat is powered by a level of electrical energy that changes over time, and wherein the thermostat includes one or more sense elements for sensing a measure that is related to the level of electrical energy powering the thermostat.

12. The thermostat of claim 11, wherein the controller determines the measure related to the ambient temperature outside of the housing based, at least in part, on a predetermined relationship between the measure related to the ambient temperature outside of the housing, the measure related to the temperature in the first region reported by the first temperature sensor, the measure related to the temperature in the second region reported by the second temperature sensor, the first constant, and the measure related to the level of electrical energy powering the thermostat.

13. The thermostat of claim 1 further comprising:
a third temperature sensor for reporting a measure that is related to the temperature in a third region within the housing;
the controller determining a measure related to an air flow direction and/or air flow magnitude about the housing that is based, at least in part, on the measure related to the temperature in the third region reported by the third temperature sensor; and
the controller using the measure related to the air flow direction and/or air flow magnitude about the housing when determining the measure related to the ambient temperature outside of the housing.

14. A thermostat for controlling temperature control equipment, comprising:
a housing;
one or more heat generating elements within the housing, the one or more heat generating elements causing a first region within the housing to be at a different temperature than a second region within the housing;
a first temperature sensor within the housing for reporting a measure that is related to the temperature in the first region;
a second temperature sensor within the housing for reporting a measure that is related to the temperature in the second region;
a controller for receiving the measure related to the temperature in the first region and the measure related to the temperature in the second region, and for determining a measure related to an ambient temperature outside of the housing based, at least in part, on the measure related to the temperature in the first region, the measure that is related to the temperature in the second region, a first constant and a second constant; and
the controller reporting the measure related to the ambient temperature to a thermostat control algorithm.

15. The thermostat of claim 14, wherein the thermostat control algorithm uses the measure related to the ambient temperature determined by the controller to determine one or more control signals for controlling temperature control equipment.

16. A method for controlling temperature control equipment, including determining a measure related to an ambient temperature outside of a housing by using temperature sensors within the housing, wherein the housing includes one or more heat generating elements within the housing, the method comprising:
obtaining a measure related to the temperature in a first region within the housing using a first temperature sensor;
obtaining a measure related to the temperature in a second region within the housing using a second temperature sensor, wherein the first region is at a different temperature than the second region;
determining the measure related to the ambient temperature outside of the housing based on:
the obtained measure related to the temperature in the first region;
the obtained measure related to the temperature in the second region; and
a relationship between the measure related to the ambient temperature outside of the housing and the obtained measure related to the temperature in the first region, the obtained measure related to the temperature in the second region, a first constant and a second constant, wherein the relationship is defined at least in part by the first constant and the second constant; and
providing one or more control signals for controlling the temperature control equipment, which control signals are based at least in part on the indication of ambient temperature outside of the housing.

17. The method of claim 16 further comprising:
obtaining a measure related to the temperature in a third region within the housing using a third temperature sensor; and
determining the measure related to the ambient temperature outside of the housing based, at least in part, on the obtained measure related to the temperature in the first region, the obtained measure related to the temperature in the second region, and the obtained measure related to the temperature in a third region.

18. The method of claim 16, further comprising:
determining one or more control signals for controlling temperature control equipment based, at least in part, on the measure related to the ambient temperature outside of the housing.

19. A method for determining a measure related to an ambient temperature outside of a housing of a device by using two or more temperature sensors within the housing, wherein the housing includes one or more heat generating elements within the housing, the method comprising:
obtaining measures related to the temperatures in each of two or more regions within the housing using two or more temperature sensors, wherein the heat generating elements within the housing cause each of the two or more regions to be at a different temperature; and
determining the measure related to the ambient temperature outside of the housing based, at least in part, on:
the obtained measures related to the temperatures in each of two or more regions within the housing;
a relationship between the measure related to the ambient temperature outside of the housing, the obtained measures related to the temperature in each of two or more regions within the housing, and two or more constants, wherein the relationship is defined at least in part by the two or more constants; and reporting the measure related to the ambient temperature to a control algorithm that is used to control temperature control equipment.

20. The method of claim 19, further comprising:

determining one or more control signals for controlling temperature control equipment based, at least in part, on the measure related to the ambient temperature outside of the housing.

21. The method of claim 19, further comprising:

determining a measure related to an air flow direction and/or air flow magnitude about the housing based, at least in part, on the temperature in one or more of the two or more regions within the housing.

22. The method of claim 21, further comprising:

determining the measure related to the ambient temperature outside of the housing based, at least in part, on the measure related to the air flow direction and/or air flow magnitude about the housing.

23. A device for use in a thermostat application, comprising:

a first temperature sensor situated at a first location in a housing;

a second temperature sensor situated at a second location in the housing;

a controller receiving a first temperature from the first temperature sensor and a second temperature from the second temperature sensor;

wherein the controller determines an indication of ambient temperature outside of the housing based, at least in part, on: the first temperature, the second temperature, and a predetermined relationship between the ambient temperature, the first temperature, the second temperature, and two or more constants, wherein the predetermined relationship is defined at least in part by the two or more constants; and the controller provides one or more control signals for controlling temperature control equipment, which control signals are based at least in part on the indication of ambient temperature outside of the housing.

24. The device of claim 23, wherein the predetermined relationship includes a two-dimensional relationship.

25. A device for use in a thermostat application, comprising:

a first temperature sensor situated at a first location in a housing for measuring a first temperature at the first location;

a second temperature sensor situated at a second location in the housing for measuring a second temperature at the second location;

a third temperature sensor situated at a third location in the housing for measuring a third temperature at the third location;

wherein the first temperature, the second temperature and the third temperature are at different temperatures during operation of the device;

a controller receiving the first temperature from the first temperature sensor, the second temperature from the second temperature sensor, and the third temperature from the third temperature sensor;

wherein the controller determines an indication of ambient temperature outside of the housing based, at least in part, on: the first temperature, the second temperature, the third temperature, and a predetermined relationship between the ambient temperature and each of the first temperature, the second temperature and the third temperature; and wherein the controller provides one or more control signals for controlling temperature control equipment, which control signals are base at least in part on the indication of ambient temperature outside of the housing.

26. The device of claim 25, wherein the predetermined relationship includes a three-dimensional relationship.

* * * * *